United States Patent
Niles et al.

(10) Patent No.: US 7,954,157 B2
(45) Date of Patent: May 31, 2011

(54) SYSTEM AND METHOD FOR BACKING UP DATA

(75) Inventors: Ronald S. Niles, Teaneck, NJ (US); Wai Lam, Jericho, NY (US)

(73) Assignee: FalconStor, Inc., Melville, NY (US)

( * ) Notice: Subject to any disclaimer, the term of this patent is extended or adjusted under 35 U.S.C. 154(b) by 1224 days.

(21) Appl. No.: 11/440,910

(22) Filed: May 25, 2006

(65) Prior Publication Data

US 2006/0218638 A1    Sep. 28, 2006

Related U.S. Application Data

(62) Division of application No. 10/348,834, filed on Jan. 22, 2003, now Pat. No. 7,055,008.

(51) Int. Cl.
*G06F 12/00* (2006.01)

(52) U.S. Cl. ............... 726/23; 705/28; 705/72; 726/26; 713/181; 713/188

(58) Field of Classification Search .............. 711/161, 711/162; 705/59, 22, 28, 72; 713/181, 188; 726/23, 26
See application file for complete search history.

(56) References Cited

U.S. PATENT DOCUMENTS

| | | |
|---|---|---|
| 4,641,274 A | 2/1987 | Swank |
| 4,912,637 A | 3/1990 | Sheedy et al. |
| 5,559,991 A | 9/1996 | Kanfi |
| 5,794,254 A | 8/1998 | McClain |
| 5,909,700 A | 6/1999 | Bitner et al. |
| 5,978,791 A | 11/1999 | Farber et al. |
| 6,041,411 A * | 3/2000 | Wyatt .............................. 726/29 |
| 6,085,298 A | 7/2000 | Ohran |
| 6,101,507 A | 8/2000 | Cane et al. |
| 6,148,382 A | 11/2000 | Bitner et al. |
| 6,182,198 B1 | 1/2001 | Hubis et al. |
| 6,202,135 B1 | 3/2001 | Kedem et al. |
| 6,289,356 B1 | 9/2001 | Hitz et al. |
| 6,374,266 B1 | 4/2002 | Shnelvar |
| 6,397,309 B2 | 5/2002 | Kedem et al. |
| 7,412,462 B2 * | 8/2008 | Margolus et al. ............. 707/200 |
| 2002/0138744 A1 | 9/2002 | Schleicher et al. |
| 2003/0005306 A1 | 1/2003 | Hunt et al. |
| 2003/0033286 A1 * | 2/2003 | Burgess .......................... 707/1 |
| 2003/0182414 A1 | 9/2003 | O'Neill |

OTHER PUBLICATIONS

Burger, Ralf; "Computer Viruses, a high-tech disease," Chapter 14 "More Protection Strategies," pp. 231-252, Table of Contents and Index; Second Edition, Dec. 1988, USA.

* cited by examiner

*Primary Examiner* — Jasmine Song
(74) *Attorney, Agent, or Firm* — Brandon N. Sklar, Esq.; Kaye Scholer LLP

(57) ABSTRACT

A method is provided to facilitate the detection of file tampering, such as a computer virus, on a computer. In one example, a digital fingerprint is generated for each file on the computer using a substantially collision-free algorithm. The digital fingerprints of the computer files are compared with digital fingerprints of the computer files generated when the files were previously saved. If the digital fingerprint of that file differs from the digital fingerprint generated when that file was previously saved, a computer virus or other tampering may exist on the file.

12 Claims, 3 Drawing Sheets

SYSTEM AND METHOD FOR BACKING UP DATA

The present application is a division of U.S. application Ser. No. 10/348,834, which was filed on Jan. 22, 2003, now U.S. Pat. No. 7,055,008, assigned to the assignee of the present application, and is incorporated by reference herein in its entirety.

BACKGROUND OF THE INVENTION

This invention relates generally to a system and method for storing data. More particularly, this invention relates to protecting stored data efficiently.

Over time in a typical computer environment, large amounts of data are typically written to and retrieved from storage devices connected to the computer. As more data are exchanged with the storage devices, it becomes increasingly difficult for the data owner to reproduce these data if the storage devices fail. One way of protecting data is by backing up the data to backup media (e.g., tapes or disks). Such backup is typically performed manually or automatically at preset intervals using backup software. The backup media are then stored away in a safe location. Continuous backups result in a collection of backup media. Because of space constraints, however, backup media are generally only kept for a finite period of time, and then the oldest backup medium is written over with the newest backup data. The length of this time period, or "backup window," thus depends on the number of backup media and the amount of data each medium contains.

Making full backups of a system is very time-consuming. One way to reduce the need for full backups, thereby increasing the backup window, is to perform incremental or differential backups between full backups. An incremental backup backs up only files that have changed since the last full or incremental backup. A differential backup backs up every file that has changed since the last full backup. The difference between the two is shown in the following example. Assume a full backup is performed weekly, e.g., every Saturday night, and the incremental or differential backup is performed nightly. In order to restore data corrupted or lost on Friday, a system using incremental backup requires the full backup from the previous Saturday, as well as each incremental backup from the intervening five nights. A system using differential backup also requires the full backup from the previous Saturday, but only requires the differential backup made on Thursday night, because that includes all the files changed since the previous Saturday. Thus, each incremental backup takes less time and stores less data than a differential backup, but a differential backup allows corrupted or lost data to be restored more easily and quickly.

One method of performing an incremental or differential backup is to set an "archive flag" for each file after it is backed up. If the file is changed (or is new), the archive flag is reset. Then, during the subsequent backup, the backup software only looks for files whose archive flags have been reset.

One disadvantage of incremental and differential backup is that the scope of the archive flag is limited to an individual computer. When backing up two or more different computers, such as those found in a network, the files on both computers must be backed up. An archive flag system backs up the files on a first computer, and any identical files loaded on the second computer will have their archive flag reset on that computer, indicating that those files should also be backed up. Such backup of identical files on the second computer is a duplication of space and effort, however, because only one backup copy of any specific file need be available. Another disadvantage of the archive flag system is that if a large file is modified only slightly, the archive flag will be reset, no matter how small the change is, and the entire file will have to be backed up again.

This latter limitation is addressed by U.S. Pat. No. 5,559,991 to Kanfi, issued Sep. 24, 1996. That patent discloses performing an incremental backup by dividing a file into blocks, generating a signature for each block, and backing up the block if the signature differs from a signature generated for an earlier version of the block. If the signature is the same, no backup is necessary. The backup computer (i.e., the computer controlling the backup) associates each block with the file from which it came. The advantage of this backup process is that if a large file is only slightly modified, only the modified blocks will be backed up, not the whole file. However, the process is limited to backing up versions of specific, named files on individual computers, even if the identical file (or data block) is located on the same computer but under a different name or it is located on another computer on the same network.

Another reference attempts to solve this last limitation. U.S. Pat. No. 6,374,266 to Shnelvar, issued Apr. 16, 2002, discloses dividing data to be backed up into data units, generating a hash value for each data unit, and backing up the data unit if the hash value does not match a hash value saved in a table. If the generated hash value does match one in the table, the method compares the actual data in the data unit to the data associated with the hash value in the table. If the data are the same, the data in the data unit are not backed up; if the data are not the same, then the data unit is backed up, and the table is updated to reflect the addition. This method is able to back up data from multiple computers and does not back up identical data units that reside on different computers.

The method of the Shnelvar patent, however, is not efficient because whenever there is a hash-value match, that method compares the actual data in the data unit to the data associated with the hash value in the table. In Shnelvar, a hash-value match can occur when the data units giving rise to the hash values are the same or when there is a hash-value "collision"—when the data units are different but the generated hash values are the same. Shnelvar performs a data comparison because of the possibility of hash-value collisions. However, in a system in which much of the data does not change between backups, there will be numerous hash-value matches, and the backup will spend a significant amount of time comparing the actual data, especially if the data are not local to the computer being backed up, or are only available over a low-speed data link.

SUMMARY OF THE INVENTION

The inefficiency of the Shnelvar patent can be avoided by using a substantially collision-free hash-optimized backup process. A hash-optimized backup process takes data blocks and generates a probabilistically unique digital fingerprint of the content of that data block. The process compares the generated fingerprint to a database of stored fingerprints and, if the generated fingerprint matches a stored fingerprint, the data block is determined to already have been backed up, and therefore does not need to be backed up again. Only if the generated fingerprint does not match a stored fingerprint is the data block backed up, at which point the generated fingerprint is added to the database of stored fingerprints. Because the algorithm is substantially collision-free, there is no need to compare actual data content if there is a hash-value match.

In accordance with one embodiment of the invention, a method facilitating the detection of file tampering, such as a computer virus, on a computer, is disclosed. In one example, the method comprises generating a digital fingerprint for each file on the computer using a substantially collision-free algorithm and then comparing the digital fingerprints of the computer files with digital fingerprints of the computer files generated when the files were previously saved. If the digital fingerprint of that file differs from the digital fingerprint saved. If the digital fingerprint of that file differs from the digital fingerprint generated when that file was previously saved, a computer virus or other tampering may exist on the file.

In accordance with another embodiment of the invention, a method is disclosed comprising generating a digital fingerprint of a computer virus itself using a substantially collision-free algorithm, generating a digital fingerprint for each file on the computer using the substantially collision-free algorithm, and comparing the digital fingerprints from the computer files with the digital fingerprint of the computer virus. If any digital fingerprint of the computer files matches the digital fingerprint of the computer virus, the virus exists on the computer.

These methods for detecting computer viruses can be generalized to detect any unwanted type of "malicious software" (a.k.a. "malware"), such as adware, spyware, worms, and other software installed without permission.

When used herein, a "storage device" can mean a disk drive, a memory-based storage system, an optical disk, or a logical partition within a data storage device.

Additional advantages of the invention will be set forth in the description which follows, and in part will be apparent from the description, or may be learned by practice of the invention. The advantages of the invention may be realized and obtained by means of the instrumentalities and combinations particularly pointed out in the appended claims.

BRIEF DESCRIPTION OF THE DRAWINGS

The accompanying drawings, in which like reference numerals represent like parts, are incorporated in and constitute a part of the specification. The drawings illustrate presently preferred embodiments of the invention and, together with the general description given above and the detailed description given below, serve to explain the principles of the invention.

DETAILED DESCRIPTION OF THE PREFERRED EMBODIMENTS

The present invention generates a probabilistically unique digital fingerprint of the content of each data block of a file. If the generated fingerprint matches a fingerprint that is already stored, the block is not backed up and the digital fingerprint is associated with the data block. If no match occurs, the block is backed up and the digital fingerprint is associated with the data block.

Figure 1:
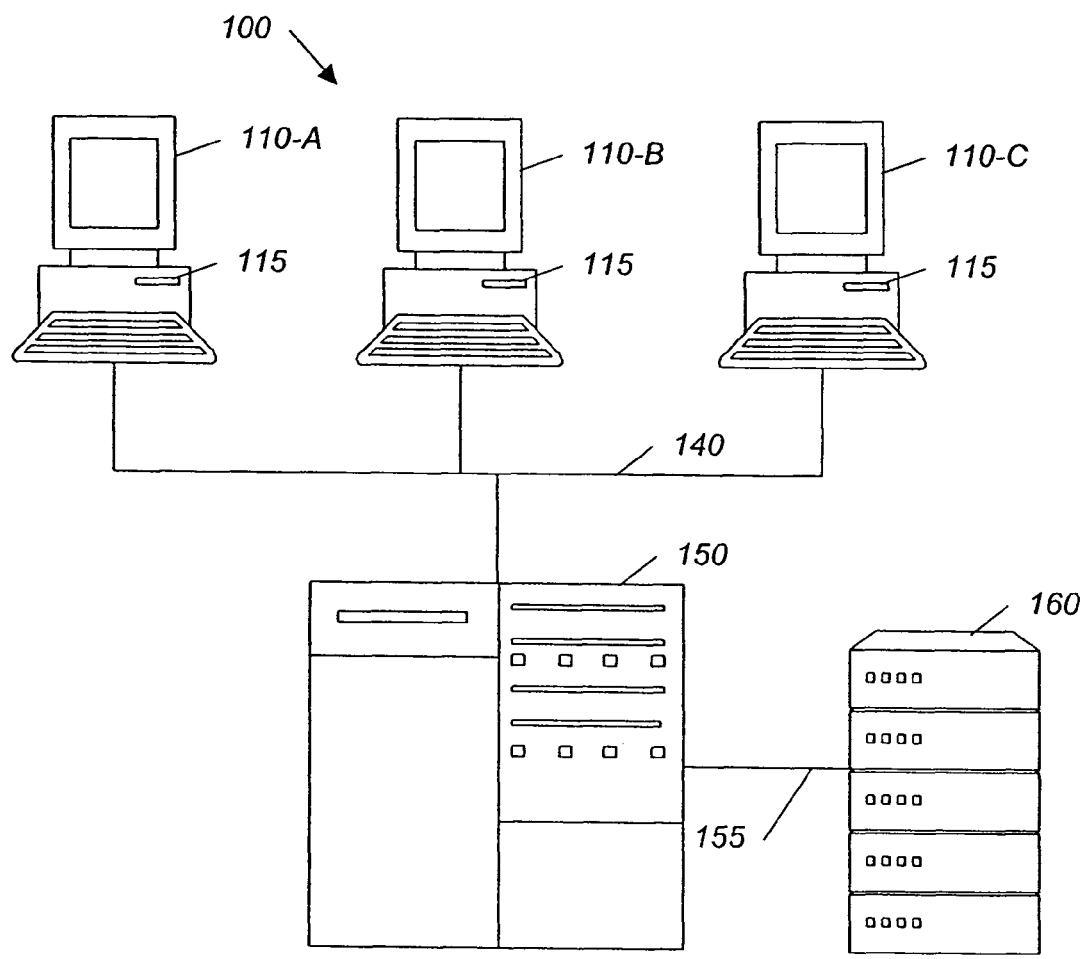
FIG. 1 is a block diagram illustrating a system for backing up data in accordance with an embodiment of the present invention.

FIG. 1 illustrates an embodiment of the present invention. System 100 includes any number of computers 110 (three of which, 110-A, 110-B, 110-C, are shown in FIG. 1) connected to backup server 150 via network 140. As shown in FIG. 1, computers 110 are optionally connected to each other over network 140. Connected to backup server 150 via communication path 155, which may be, for example, a Fibre Channel or SCSI connection, is storage device 160. Backup server 150 is a central computer whose main function is to back up or archive data stored on other computers and servers on a computer network. Network 140 may be, for example, a LAN, a WAN, a MAN, or an internetwork of computers, such as the Internet. Storage device 160 acts as the backup (or archive) device for computers 110 and has a large capacity (e.g., terabytes). In order to satisfy the backup needs for system 100, there may be more than one storage device 160 connected to backup server 150. In system 100, computers 110 typically include local storage 115 (e.g., a hard disk drive) for saving data and files between backups. Alternatively, computers 110 may have no local storage and be part of a storage area network (SAN) in which case another server (not shown) connected to network 140, such as a file server or a data server, stores data and files on a primary storage device connected to that server.

Figure 2:
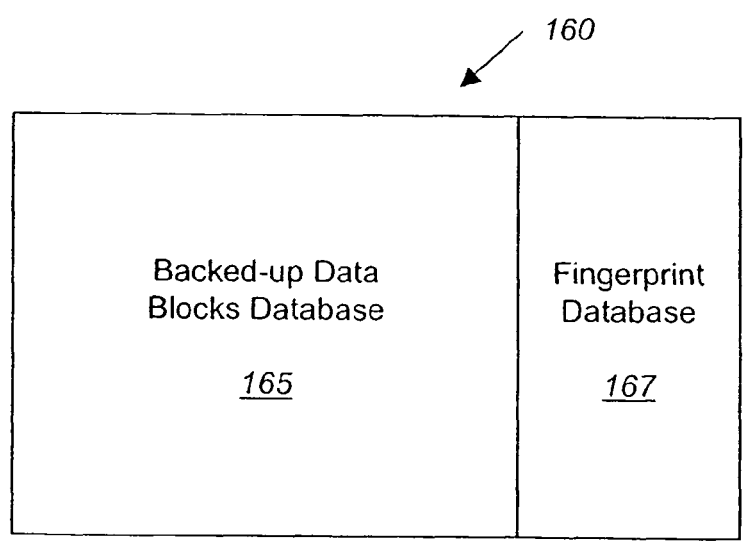
FIG. 2 is a block diagram illustrating storage within a storage device in accordance with an embodiment of the present invention.

As shown in FIG. 2, storage device 160 includes storage for at least backed-up data blocks in database 165 (a "data" database) and digital fingerprints in database 167 (a "metadata" database). Database 167 includes digital fingerprints and information relating (e.g., cross-referencing) the digital fingerprints to the data blocks. Database 167 also includes the location (i.e., which computer 110 and the location on that computer) from which the data blocks came, so that the data can be restored if the local storage is lost or destroyed. Because data blocks appearing on more than one computer are not backed up, storage device 160 can back up much more data and files than prior art backup systems.

Backup server 150 typically includes software that can schedule and initiate periodic backups. If computers 110 include local storage 115, an "agent" residing on each computer 110 scans all the files on that computer, dividing the files into data blocks and computing digital fingerprints for each block. (Alternatively, the agent may reside on backup server 150 and perform these tasks via network 140. If computers 110 do not include local storage, an agent residing on the data or file server of the SAN performs these tasks.) For each block, each computer 110 contacts backup server 150, which compares the digital fingerprint of that block to those in database 167 and determines if there is a match. If there is a match, there is no need to copy the data block to storage device 160 because the data block is already there. In such a case, database 167 will be updated to include a cross-reference from the digital fingerprint to the current data block's source or location. If there is no match, the data block is copied to storage device 160, and the digital fingerprint and data block location are added to database 167. The backup thus consists of backed-up data blocks database 165, a list of the digital fingerprints, and the data block or blocks associated with each of the digital fingerprints (along with the data block's origin information).

Figure 3:
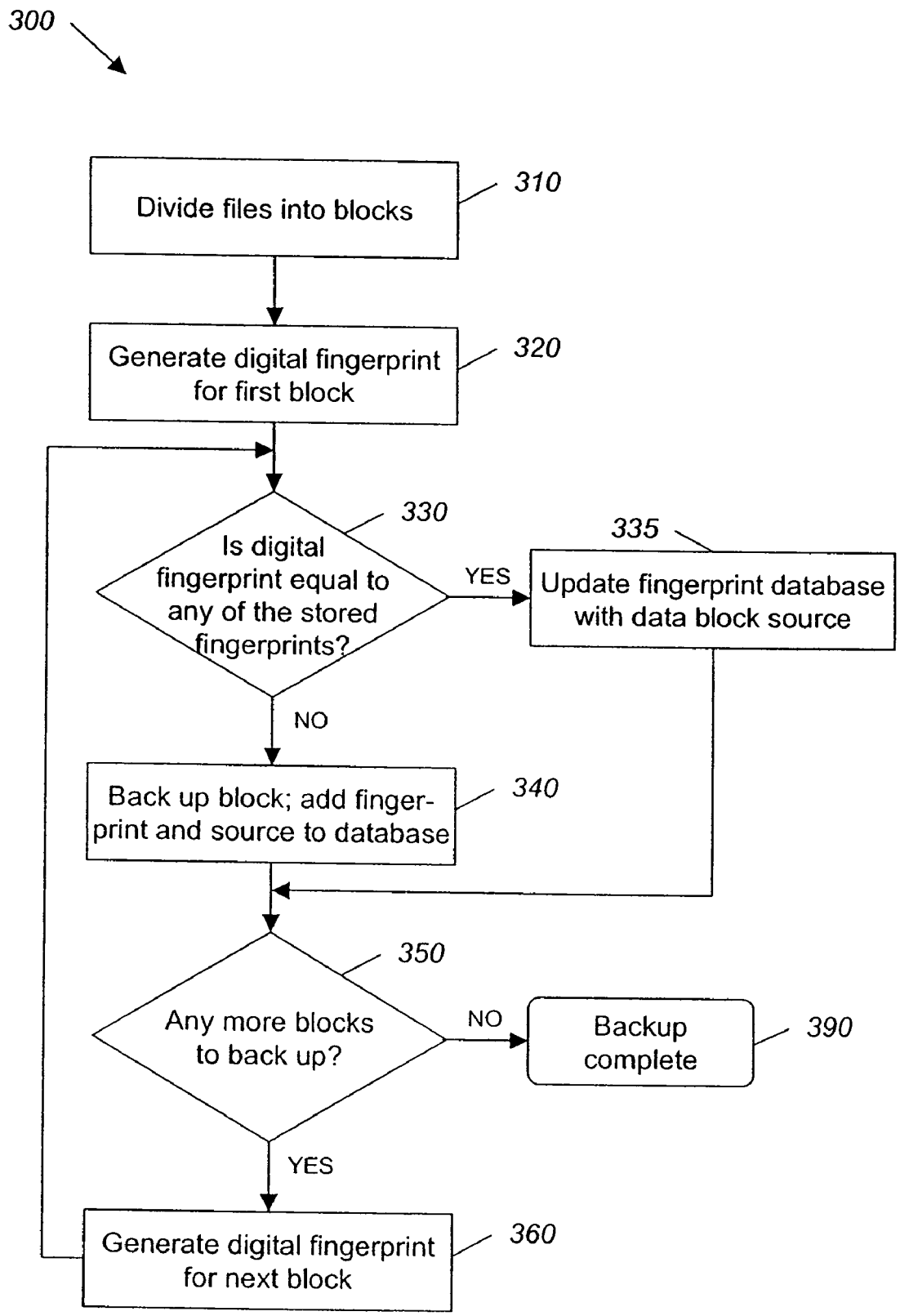
FIG. 3 is a flowchart depicting backing up data in accordance with an embodiment of the present invention.

The flowchart 300 in FIG. 3 shows how the backup process operates. First, in step 310, each file may be divided into data blocks. The size of these blocks may be fixed or variable, depending on the operating system or the system administrator's preferences. Fixed blocks are easier to manage, but may waste space. Variable blocks make a better use of the available backup space, but are somewhat more difficult to keep track of. In addition, the size of the blocks may vary from file to file. For instance, one option may be to have each file contain a set number of blocks, N—the size of each block from a larger file of size S1 would be S1/N and the size of each block from a smaller file of size S2 would be S2/N, where S1/N>S2/N. A special case of a variable-sized block is the whole file itself (i.e., where N=1), however, it is likely more advantageous to have smaller-sized blocks in order to avoid having to save large files that change only slightly between backups. In addition, the size of the blocks may be limited by the requirements of the specific algorithm used to create the digital fingerprint.

Once the files are divided into data blocks, step 320 generates a digital fingerprint for each data block. The algorithm for generating the fingerprint is preferably a hash function. A hash function performs a transformation on an input and returns a number having a fixed length—the hash value. Properties of a hash function as used in the present invention are that it should (1) be able to take a variable-sized input and generate a fixed-size output, (2) compute the hash value relatively easily and quickly for any input value, and (3) be substantially (or "strongly") collision-free. Hash functions satisfying these criteria include the MD5 and SHA-1 algorithms, although others are available or will be available in the future.

The MD5 ("message digest 5") algorithm was created by Professor Ronald Rivest of MIT and RSA Laboratories. It generates a 16-byte (128-bit) hash value. It is designed to run on 32-bit computers. Earlier algorithms created by Professor Rivest, MD2 and MD4, developed in 1989 and 1990, respectively, also produce 128-bit hash values, but have been shown not to be substantially collision-free. MD5 was created in 1991 and is slightly slower than MD4, but more secure. MD5 is substantially collision-free. Using MD5, fingerprints may be generated at high speed on most computers.

The SHA-1 ("secure hash algorithm") algorithm was developed in 1994 by the U.S. National Institute of Standards and Technology (NIST). It generates a 20-byte (160-bit) hash value. The maximum input length of a data block to the SHA-1 algorithm is $2^{64}$ bits (~$1.8 \times 10^{19}$ bits). The design of SHA-1 is similar to that of MD4 and MD5, but because its output is larger, it is slightly slower than MD5, but more collision-free.

Before performing the first backup for backup server 150, data database 165 and metadata database 167 are empty. Thus, there can be no fingerprint matching as called for in step 330. Instead, flowchart 300 proceeds directly to step 340 to back up the data block in backed-up data blocks database 165 and record in database 167 the digital fingerprint and the source of the data block (i.e., the file path, including which computer 110 and where the data block resides on the computer). Step 350 asks whether any more data blocks need to be backed up. If so, then step 360 generates the digital fingerprint for the next block in the same manner as was done in step 320. Now, because data database 165 and metadata database 167 are not empty, step 330 compares the digital fingerprint of the data block being backed up to the stored digital fingerprint. Because the hash function generating the digital fingerprint is substantially collision-free, if there is a match, it is assumed that the data block has been backed up already and therefore step 335 only has to update database 167 to associate that digital fingerprint with the source of the data block. If there is no match, step 340 backs up the data block in backed-up data blocks database 165 and records in database 167 the digital fingerprint and the source of the data block. This loop of steps 360, 330, 335/340, and 350 continues until there are no more data blocks on any of the computers 110 to back up. In that case, step 350 returns NO and the backup is complete in step 390.

Figure 4:
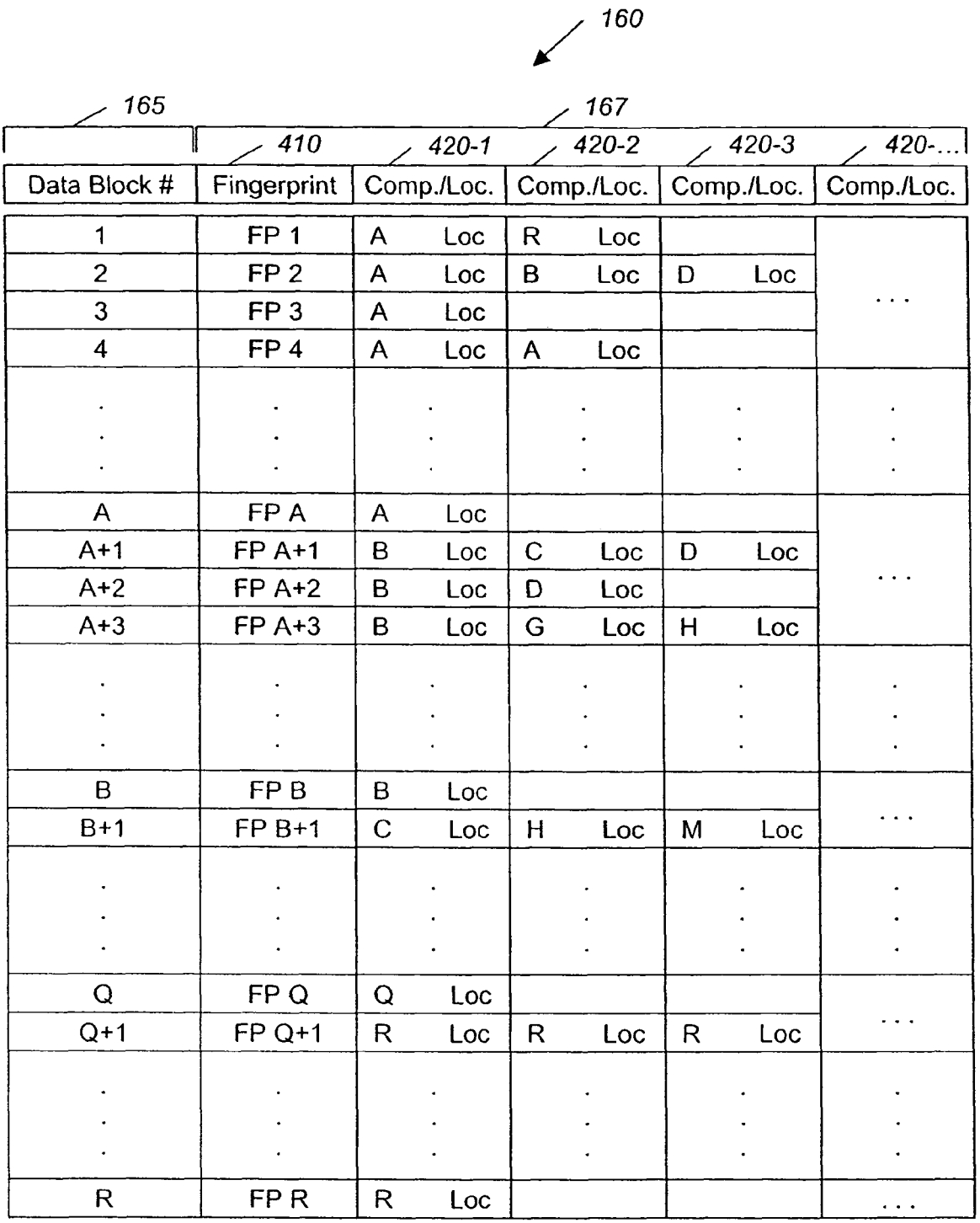
FIG. 4 is a schematic depicting the contents of the backup databases in accordance with an embodiment of the present invention.

FIG. 4 shows one way of illustrating the contents of databases 165 and 167 during a backup of computers 100-A to 110-R. Database 165 includes a list of all the data blocks that have been backed up. Database 167 includes column 410 for the digital fingerprint for each data block and columns 420-1, 420-2, 420-3, etc., for the source(s) (i.e., computer and block location) of those data blocks. Thus, the first data block, 1, is placed in database 165, and its digital fingerprint, FP 1, is placed in database 167, along with the source computer, 110-A, and the location, "Loc". "Loc" may be a memory or a cluster location in the source computer, and uniquely identifies the data block's source location at the time of backup. Consecutive data blocks 1, 2, 3, etc. do not have to come from adjacent locations in the source computer. For example, a file may be made up of 200 data blocks that will be placed in database 165 consecutively, but their locations on the source computer do not have to be consecutive.

The next data block whose fingerprint does not match any fingerprint in column 410 is numbered data block 2 and placed in database 165. Its fingerprint, FP 2, is placed in column 410 along with the location in computer 110-A. If the fingerprint of the data block does match an existing fingerprint, the data block itself is not backed up again, but the location in computer 10-A is noted in column 420-2 (see, e.g., the entry for data block 4, which is located in two places in computer 110-A). Although only three columns 420 are shown in FIG. 4, there can be many columns 420, each one recording the location of the same data block at different locations on the same computer or on different computers. Thus, data block 1 also exists on computer 110-R and data block 2 also exists on computers 110-B and 110-D. The process continues until all of the A (where A is an integer) unique data blocks from computer 110-A have been backed up.

The next block to be backed up comes from computer 110-B. If this block is unique, it is numbered data block A+1 and is placed in database 165. Its fingerprint, FP A+1, is then placed in column 410 along with the location in computer 110-B. If the fingerprint of the data block matches an existing fingerprint, however, the data block itself is not backed up again, but the location in computer 110-B is noted in the next appropriate column 420 (see, e.g., the entry for data block 2, which is located in computers 110-A and 110-B). Thus, data block A+1 also exists on computers 110-C and 110-D, data block A+2 also exists on computer 110-D, and data block A+3 also exists on computers 110-G and 110-H. This process continues until all of the B-A (where B is an integer) unique data blocks from computer 110-B have been backed up.

The next block to be backed up comes from computer 110-C. If this block is unique, it is numbered data block B+1 and is placed in database 165. Its fingerprint, FP B+1, is then placed in column 410 along with the location in computer 110-C. If the fingerprint of the data block matches an existing fingerprint, however, the data block itself is not backed up again, but the location in computer 110-C is noted in the next appropriate column 420 (see, e.g., the entry for data block A+1, which is located in computers 110-B, 110-C, and 110-D). Thus, data block B+1 also exists on computers 110-H and 110-M. This process continues until all of the C-B (where C is an integer) unique data blocks from computer 110-C have been backed up. The process then continues in the same manner for each of the computers from 110-D to 110-R.

The process of the present invention is more efficient than that of the prior art because the substantially collision-free nature of the hash function allows a hash-value match to represent a data block that is already backed up, and the actual data do not have to be compared to confirm that that is so.

In addition, because each backup generates a digital fingerprint for all the data blocks on the system being backed up, it is a full backup, unlike the traditional incremental or differential backup, and the fingerprint database 167 and backed-up data blocks database 165 exist permanently. In the event of lost or destroyed data, data restoration can be performed using only the most recent backup.

The present invention has many applications. An obvious application is within an enterprise environment, such as a networked office, in which a local area network 140 connects many computers 110. These computers 110 are generally configured similarly, typically having the same operating system files and basic application (e.g., word processors, e-mail, spreadsheet, presentation, etc.) programs. Because of the redundancy of these files, there is no need to back up all of the files on all of the computers—doing so would take up much-needed backup space. Using the present invention, however, allows an organization to make one backup copy of these identical files and then note the locations of those files on the other computers 110. If a single backup server 150 were used to back up all of the computers in the organization, the database would very quickly build up a list of the most common duplicated files. Once the initial backup is made in backed-up data blocks database 165, the data blocks (and the files made up by those blocks) never have to be backed up again. When new computers 110 are deployed, it is likely that all of the initial files on those computers are already contained in the backed-up data blocks database 165, thus making the initial backup of a new or existing computer extremely efficient, especially in a centralized computing environment.

This application can be extended to a MAN or a WAN, which network extends beyond the physical boundaries of a floor or a building. Because digital fingerprints can be efficiently delivered to backup server 150 for comparison to database 167 and because not every data block must be backed up, the present invention is especially suited for such remote operation.

The invention, however, is not limited to backing up files from computers that are related to each other, such as those within an organization. The invention can be used to back up computers (related or non-related) over the Internet. In such an application, the Internet is network 140. Even though the computers 110 may not be from the same organization, they may contain many identical files, such as operating system files and popular software packages. Each computer 110 can have a backup agent that scans the files on that computer, dividing the files into data blocks and computing digital fingerprints for each block. For each block, computer 110 transmits over network 140 the fingerprint to backup server 150, which compares the digital fingerprint to those in database 167 and determines if there is a match. If there is a match, database 167 updates the fingerprint to include the source, but there is no need to copy the data block to storage device 160 because the data block is already there. If there is no match, the data block is transmitted over network 140 to backup server 150 and copied to storage device 160, and the digital fingerprint and source are added to database 167. Prior art backup methods that compare the actual data when a match is found could not be used in such an application because there is usually not enough bandwidth between computer 110 and backup server 150 to perform such a backup efficiently. Prior art schemes therefore generally contemplate having the source computer and the backup server near each other or connected by high-bandwidth lines.

The invention can also be used in auditing. In such an application, auditors can assess the backup record of any computer within an enterprise to determine what is on that computer, without actually having to restore a tape. Auditors could easily ensure that computers in the enterprise have the proper operating system service packs installed without having to visit those machines. If the auditors wanted to know how many computers have a specific software package installed to verify the enterprise is in compliance with licensing requirements, they can determine that by comparing the fingerprints of one or more files within the various popular software packages in question with fingerprints generated from files in the computers in the enterprise. This could be performed by generating fingerprints for data blocks or files as a whole. Each match would count as having the particular software package in question.

This idea can be extended for use as an inventory tool. A system administrator could set up a database of the fingerprints of one or more files within the various popular software packages and then compare the database to the fingerprints of the files or data blocks of each computer in the system (or even of external computers, e.g., over the Internet). Again, each match would count as having the particular software package in question.

The present invention can be used to manage enterprise systems. Digital fingerprints can be used to prevent users from installing new programs without authority, or at least to monitor such installations.

The present invention can be used to detect viruses or other file tampering, including any unwanted type of "malicious software" (a.k.a. "malware"), such as adware, spyware, worms, and other software installed without permission. When loading a file having a known digital fingerprint, the file's fingerprint (or those of a file's data blocks) can be checked to see that it has not been changed since the file was last saved. If the fingerprint has changed, the file is likely to have been tampered with or infected by a virus. In addition, a digital fingerprint for a virus-infected file (or data block) may be determined, thereby allowing detection of the virus by fingerprint alone.

There are thus many benefits of the present invention. It improves backup efficiency and recovery (restoration) speed by reducing backup redundancy. Already backed-up files are readily identifiable. Blocks of data smaller than a whole file are backed up, thus reducing the need to backup whole files having minor changes. In an enterprise environment, in which many of the computers have the same files, the invention eliminates the need to save all of the files on all of the computers, only the files that are unique to each computer. Data can be backed up across a network such as the Internet with relative ease and speed.

Additional advantages and modifications will readily occur to those skilled in the art. Therefore, the present invention in its broader aspects is not limited to the specific embodiments, details, and representative devices shown and described herein. Accordingly, various changes, substitutions, and alterations may be made to such embodiments without departing from the spirit or scope of the general inventive concept as defined by the appended claims.

We claim:

1. A method for detecting file tampering on a computer, comprising:

generating a first digital fingerprint for a file on a computer at a first time using a substantially collision-free algorithm;

saving the generated first digital fingerprint;
generating a second digital fingerprint for the file on the computer at a second time after the first time using a substantially collision-free algorithm;
comparing the second digital fingerprint with the first digital fingerprint; and
determining by a processor that the file has been tampered with if the first digital fingerprint differs from the second digital fingerprint.

2. The method of claim 1, further comprising:
dividing the file into data blocks, before the first time;
generating a first digital fingerprint of at least one of the data blocks, at the first time;
dividing the file into data blocks, before the second time; and
generating a second digital fingerprint of the at least one of the data blocks at the second time.

3. The method of claim 1, wherein the file tampering comprises infection by a computer virus.

4. The method of claim 1, wherein the file tampering comprises tampering by malicious software.

5. A method for detecting a computer virus on a computer, comprising:
generating a digital fingerprint of a computer virus using a substantially collision-free algorithm;
generating digital fingerprints for files on a computer using the substantially collision-free algorithm;
comparing the digital fingerprints of the files with the digital fingerprint of the computer virus; and
determining by a processor that the computer virus exists on the computer if any digital fingerprint of the files matches the digital fingerprint of the computer virus.

6. The method of claim 5, further comprising:
dividing the files into data blocks; and
generating a digital fingerprint for the data blocks.

7. A system for detecting file tampering on a computer, the computer comprising:
at least one memory device configured to store data; and
a processor configured to:
generate a first digital fingerprint for a file stored on the at least one memory device using a substantially collision-free algorithm, at a first time;
store the generated first digital fingerprint;
generate a second digital fingerprint for the file using a substantially collision-free algorithm, at a second time after the first time;
compare the second digital fingerprint with the first digital fingerprint; and
determine that the file has been tampered with if the first digital fingerprint differs from the second digital fingerprint.

8. The system of claim 7, wherein the processor is further configured to:
dividing the file into data blocks, before the first time;
generating a first digital fingerprint of at least one of the data blocks, at the first time;
dividing the file into data blocks, before the second time; and
generating a second digital fingerprint of the at least one of the data blocks, at the second time.

9. The system of claim 7, wherein the file tampering comprises infection by a computer virus.

10. The system of claim 7, wherein the file tampering comprises tampering by malicious software.

11. A system for detecting a computer virus on a computer, the computer comprising:
at least one memory device configured to store data; and
a processor configured to:
generate a digital fingerprint of the computer virus using a substantially collision-free algorithm;
generate digital fingerprints for files stored in the at least one memory device using a substantially collision-free algorithm;
compare the digital fingerprints of the files with the digital fingerprint of the computer virus; and
determine that the computer virus exists on the computer if the digital fingerprint of the computer file matches the digital fingerprint of the computer virus.

12. The system of claim 11, wherein the processor is configured to:
divide the file into data blocks before the first time; and
generate a digital fingerprint of at least one data block, at the first time.

* * * * *